March 10, 1970  R. HOF  3,499,815
FILAMENT WINDING APPARATUS
Filed Sept. 26, 1966  2 Sheets-Sheet 1

INVENTOR
RICHARD HOF
BY
Merl E. Sceales
Attorney

March 10, 1970 R. HOF 3,499,815
FILAMENT WINDING APPARATUS
Filed Sept. 26, 1966 2 Sheets-Sheet 2

INVENTOR
RICHARD HOF
BY
Merl E Sceales
Attorneys

United States Patent Office 3,499,815
Patented Mar. 10, 1970

3,499,815
FILAMENT WINDING APPARATUS
Richard Hof, North Little Rock, Ark., assignor, by mesne assignments, to A. O. Smith-Inland Inc., Milwaukee, Wis., a corporation of Delaware
Filed Sept. 26, 1966, Ser. No. 582,122
Int. Cl. B65h 81/00
U.S. Cl. 156—431                                    4 Claims

ABSTRACT OF THE DISCLOSURE

A device for gathering a series of fiber strands in the form of a tape having a greater width than thickness. The device includes a gathering member which is rotatably supported by a frame. The gathering member is provided with a series of openings which receive individual strands and the openings are arranged in a series of generally parallel first rows and a series of generally parallel second rows which are perpendicular to the first rows.

Both the first and second rows of openings straddle the axis of rotation of the gathering member and by rotating the gathering member about the axis the width of the tape can be varied.

This invention relates to a filament winding machine and more particularly to a mechanism for gathering filaments together in the form of a tape or web in preparation for winding the tape about a mandrel to form a tubular article.

Filament wound pipes or tubes are generally fabricated by winding a tape or web of fibers impregnated with resin or other binder on a mandrel in a number of superimposed layers. After the desired number of layers have been wound on the mandrel to provide the physical properties required, the resin is cured to provide an integral structure which is then stripped from the mandrel. In the conventional filament winding machine, the mandrel is mounted for rotation, and a winding head or carriage moves in a reciprocating path of travel along the mandrel and guides the fibrous tape on the mandrel in the helical pattern. The fibrous tape is formed of a number of fiber ends with each end comprising a multiplicity of individual filaments or fibers. Normally the fiber ends are stored in coiled form on creels and the various ends are unwound during the winding operation and gathered together into the form of the tape or web. After being gathered together, the tape is then impregnated with resin and passed over a distribution roller or other guide member and onto the mandrel.

In the normal filament winding operation the fibrous tape is wound in a helical pattern which can either be a crossover pattern or a sequential pattern. In the crossover pattern the turns in each pass are spaced apart and the turns in succeeding passes are laid down in abutting side-by-side relation to the turns of the preceding passes, while in the sequential pattern the side edges of adjacent turns in each pass are disposed in generally abutting relation. In both types of winding patterns it is essential to have the side edges of the turns in closely abutting relation. If the side edges are spaced apart, the space will be devoid of sufficient fibrous reinforcement to provide the necessary physical properties for the pipe, making the pipe unacceptable. Conversely, if the side edges of the turns of the tape overlap, a rippled pattern may be formed in the outer surface of the pipe which is undesirable from an appearance standpoint. Thus, in filament winding operations it is desirable to position the side edges of the turns of the tape in closely abutting relation.

The present invention is directed to a novel mechanism to be associated with a filament winding machine for gathering the fibrous ends or strands into the form of a tape and which can be readily adjusted to vary the concentration of fibers in the tape and to vary the tape width for the particular winding operation.

The mechanism of the invention includes a vertically positioned, strand gathering member having a series of openings which are located in both horizontal and vertical rows. The gathering member is mounted for rotation within an outer frame so that the member can be rotated about its geometrical center. The various fiber ends or strands are threaded into the individual openings in the gathering member with the fibers being positioned in both vertical and horizontal rows adjacent the center of the member. The fibers passing through the gathering member are collected in the form of a tape or web and the tape is then impregnated with resin prior to being wound on the mandrel in the winding operation.

By increasing the number of holes in vertical rows through which the fibrous ends or strands are threaded, the fiber concentration of the resulting tape or band can be altered. Similarly, by varying the number of vertical rows through which the strands are threaded the width of the tape can be altered. In addition, by rotating the disc a very precise or fine variation can be achieved in the width and fiber concentration of the tape. As the vertical rows are rotated out of vertical alignment the width of the tape is increased and the fiber concentration will be correspondingly reduced.

The present invention provides a simple and inexpensive device for readily changing the width and concentration of the fibers or filaments in a tape to be used in a filament winding machine. The device is particularly adaptable for use when winding tubular articles in a helical pattern and enables the operator to change or vary the width of the tape in either a crossover or sequential winding pattern so that the turns of the tape being wound on the mandrel will be in abutting side-by-side relation to avoid gaps or overlapping turns.

Other objects and advantages will appear in the course of the following description.

The drawings illustrate the best mode presently contemplated of carrying out the invention.

Figure 1:
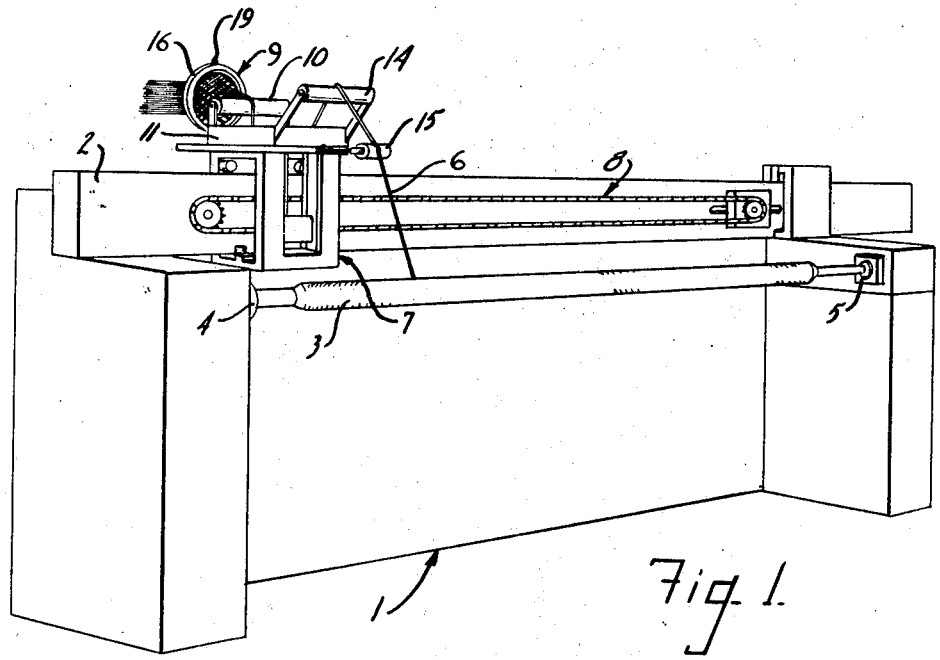
FIG. 1 is a perspective view of a typical filament winding machine incorporating the mechanism of the invention.
Figure 2:
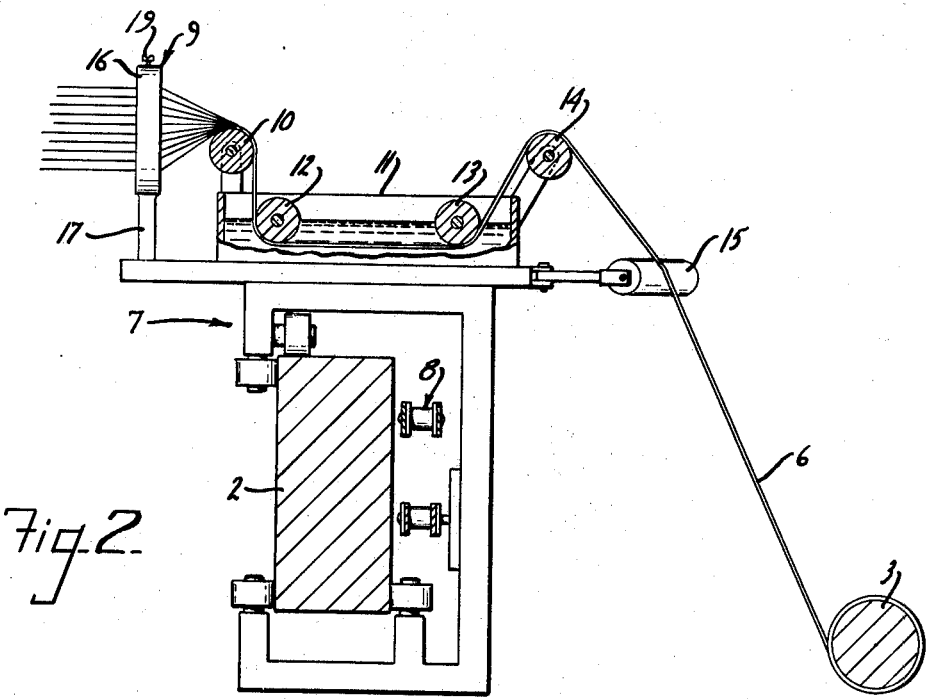
FIG. 2 is a transverse section of the machine with parts broken away.

The drawings illustrate a conventional filament winding machine which includes a casing or cabinet 1 having a horizontal rail 2 which extends the length of the cabinet. A mandrel 3 is mounted for rotation parallel to the rail 2 and one end of the mandrel 3 is engaged with a drive spindle 4 mounted on the casing 1, while the opposite end of the mandrel is engaged with an idler spindle 5 attached to a tailstock.

A fibrous web or tape 6 having a greater width than thickness is adapted to be wound on the rotating mandrel 3 by a carriage or winding head 7. The carriage 7 is mounted for reciprocating movement on the horizontal rail 2 and is driven in such movement by a conventional chain drive mechanism indicated generally by 8. The connection of the carriage 7 to the chain drive 8 is such that the connection will not interfere as the chain rides over the sprockets at the ends of its path of travel.

The tape or web 6 to be wound on the mandrel is composed of a multiplicity of fibrous ends which are contained in coiled form on a series of creels, not shown. The ends or strands are unwound from the individual creels and pass through the gathering device 9 of the invention which is mounted on the carriage 7. After passing through the gathering device 9, which gathers the ends into the form of the tape 6 or web, the tape passes over roller 10 and then through a liquid resin or binder contained within a trough 11 mounted on the carriage 7. Rollers 12 and 13 are located within the trough 11 and serve to guide the tape as it passes through the trough. After leaving the trough, the resin-impregnated tape is guided over a roller 14 and then over a distribution roller 15 and onto the mandrel 3, where it is wound in a helical pattern on the mandrel. Roller 15 is mounted for pivotal movement in a generally horizontal plane so that the roller can pivot as the winding angle changes from right hand to left hand during reciprocating travel of the carriage 7.

The fibrous tape 6 is composed of substantially continuous, unidirectional fibers or filaments and may take the form of mineral fibers such as glass or asbestos; animal fibers such as wool; vegetable fibers such as cotton; synthetic fibers such as nylon, rayon, Dacron, Orlon; metal fibers such as steel wire, and the like.

The resin or adhesive used to impregnate the fibrous tape 6 can be any thermosetting or thermoplastic resin commonly used in winding or laminating procedures. For example, the binder can be a thermosetting resin such as an epoxy, polyester, melamine-formaldehyde, urea-formaldehyde, phenol-formaldehyde, or the like, or the binder can be a thermoplastic resin such as polyvinyl chloride, polyvinylidene chloride, or the like.

The gathering device 9 of the invention includes a generally annular frame 16 which is mounted on the carriage 7 by a bracket or support 17. Rotatably mounted within the frame 16 is a ring 18 and the ring can be locked with respect to rotation within the frame 16 by a set screw 19 which extends through the frame and engages the edge of the ring.

Figure 3:
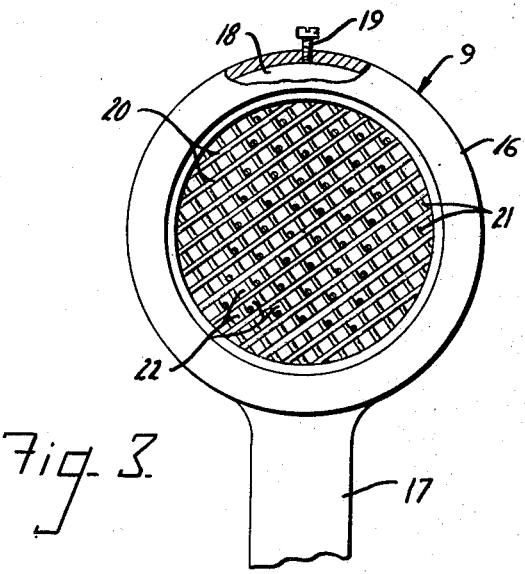
FIG. 3 is a plan view of the strand gathering device of the invention.
Figure 4:
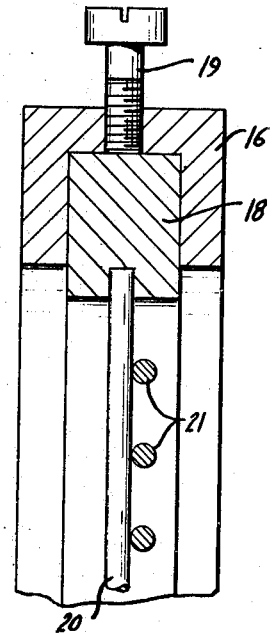
FIG. 4 is an enlarged fragmentary section taken through the strand gathering device.

According to the invention, a series of parallel rods 20 extend across the ring 18 and are brazed or otherwise secured to the ring. In addition, a second series of parallel rods 21 extend at an angle to rods 20 and are brazed to the ring as well as to the rods 20. Rods 20 in combination with rods 21 define a series of openings 22 which are arranged in rows about the geometrical center of the gathering device. As best shown in FIG. 3 the openings 22 are arranged in a series of generally vertical and horizontal rows which extend on either side of the center of the ring 18. Each of the fibrous ends being unwound from a creel is threaded within one of the openings 22 and the number of openings 22 through which the ends are threaded depends on the particular winding operation, and more specifically on the concentration of fibers desired in the tape, the width of the tape and other factors. In a typical winding operation, as shown in FIG. 3, the fiber ends are threaded through openings in six vertical rows with three of the rows being located on each side of the center of rotation of the ring 18. As shown in FIG. 3, the ends are threaded within eight openings 22 in each of the vertical rows, with four of the openings in each vertical row being located above the center of the ring 18, and four of the openings in each vertical row being located below the center of the ring. Thus, the pattern of the ends threaded within the openings 22 is concentric or symmetrical with respect to the center of the ring 18. By increasing the number of vertical rows of openings through which the fiber ends are threaded, the width of the resulting tape will be increased. On the other hand, by increasing the number of openings in each vertical row through which the fiber ends are threaded, the concentration of fibers in the tape will be increased.

Figure 5:
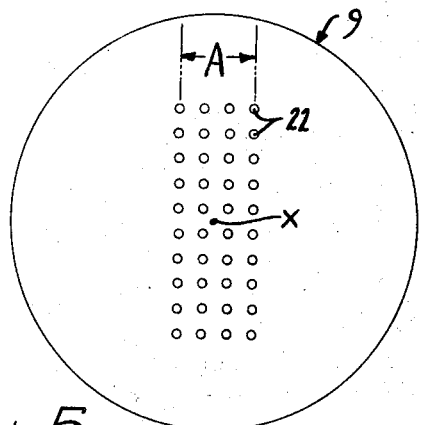
FIG. 5 is a schematic representation showing the arrangement of fiber ends passing through the openings in the gathering device.
Figure 6:
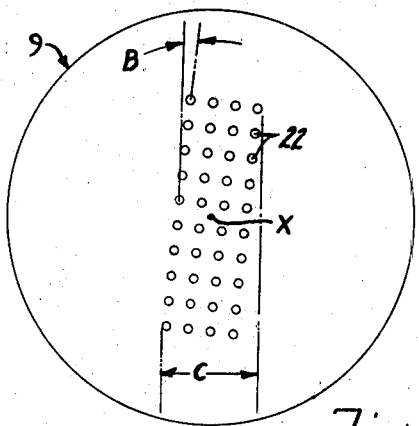
FIG. 6 is a view similar to FIG. 5 showing the change in width of the tape achieved by rotation of the gathering device.

FIGS. 5 and 6 are schematic representations showing the fine adjustment of tape width and fiber concentration which can be achieved by rotating the ring 18. As shown in FIG. 5, the various openings 22 are illustrated diagrammatically as circles, and in effect represent the fiber ends passing through the openings. The center of rotation of the ring 18 is indicated by X. The width of the tape formed by the fiber ends passing through the four series of vertical rows, as shown in FIG. 5, is indicated by A, and is equal to the distance between the outermost vertical rows. This width of the tape can be readily and accurately controlled by rotating the ring 18 about its center, as illustrated in FIG. 6. By rotating the disc through an angle B, the rows of holes are displaced from the vertical and horizontal, and the width of the tape will be increased and equal to the dimension C shown in FIG. 6. As the same number of ends passing through the openings 22 in both FIGS. 5 and 6 is the same, the fiber or filament concentration will be greater in the narrow tape shown in FIG. 5 than in the wider tape of FIG. 6. Thus, by rotating the ring 18 about its axis, an accurate and fine adjustment can be provided for the width of tape as well as the fiber concentration.

While the drawings show the gathering device of a series of metal rods which are secured to each other at the points of crossover to provide a series of generally diamond or rectangular-shaped openings, the gathering device can be formed of a plate or sheet of metal or plastic having holes drilled or punched therein. When using a flat sheet or disc, care must be taken to remove any burrs and to round or feather the edges of the openings, for the fiber ends passing through a sharp-edged opening may fray, resulting in balling of the fibers in the resin bath or in the wound pipe.

While the shape of the openings 22 is shown to be generally square or diamond-shape, the openings through which the fiber ends are passed can be of any desired configuration.

Various modes of carrying out the invention are contemplated as being within the scope of the following claims particularly pointing out and distinctly claiming the subject matter which is regarded as the invention.

I claim:

1. In a filament winding machine, a device for gathering a series of fibrous strands together in the form of a tape having a greater width than thickness, comprising a frame, and a gathering member mounted for rotational movement about an axis with respect to said frame, said gathering member having a plurality of openings arranged in a series of generally parallel first rows and a series of generally parallel second rows, said first rows being perpendicular to said second rows and both said first and second rows straddling said axis, said strands being received within the openings and being gathered together after passing through the openings in the form of a tape, the width of the tape being readily adjustable by rotating said gathering member about said axis.

2. The device of claim 1 in which each of said openings have generally parallel axes and the member is mounted for pivotal movement about an axis parallel to said axes.

3. In a filament winding machine, a device for gathering a series of fibrous strands together in the form of a tape having a greater width than thickness, comprising a frame, a gathering member mounted for rotational movement about an axis with respect to the frame, said gathering member including a first series of generally parallel rods and a second series of generally parallel rods disposed perpendicular to said first series, said first and second series of rods both being disposed at an angle to the horizontal and said first and second series of rods defining a plurality of openings to receive the individual strands, the width of the tape being drawn from said gathering member being adjustable by rotation of said gathering member about said axis, means for locking the gathering member against rotation with respect to said frame, and guide means mounted adjacent the gathering member for receiving the strands as they are drawn in the form of a tape.

4. The apparatus of claim 3, wherein the gathering member has a generally circular periphery which is mounted for rotation with respect to the frame.

References Cited

UNITED STATES PATENTS

| | | | |
|---|---|---|---|
| 2,897,841 | 8/1959 | Wai Hui et al. | 156—178 XR |
| 2,995,175 | 8/1961 | Lundskow | 156—429 |
| 3,345,230 | 10/1967 | McClean | 156—181 |
| 3,378,427 | 4/1968 | McClean | 156—431 |

FOREIGN PATENTS

| | | |
|---|---|---|
| 238,021 | 9/1959 | Australia. |
| 258,254 | 12/1962 | Australia. |

HAROLD ANSHER, Primary Examiner

D. J. FRITSCH, Assistant Examiner

U.S. Cl. X.R.

57—58.83; 156—433, 446